(12) United States Patent
Yokota et al.

(10) Patent No.: US 7,623,480 B2
(45) Date of Patent: Nov. 24, 2009

(54) COMMUNICATION APPARATUS, CONTROL METHOD, AND PROGRAM THEREFOR

(75) Inventors: Akane Yokota, Kawasaki (JP); Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 11/265,311

(22) Filed: Nov. 1, 2005

(65) Prior Publication Data

US 2006/0165133 A1    Jul. 27, 2006

(30) Foreign Application Priority Data

Nov. 4, 2004    (JP) ............................. 2004-321160

(51) Int. Cl.
*H04B 7/185* (2006.01)
(52) U.S. Cl. .................. 370/318; 370/311; 370/338; 370/328; 455/522
(58) Field of Classification Search ............... 455/522, 455/69, 552.1, 524, 344, 574, 41.2, 517, 455/507, 550.1, 556.1; 370/338, 328, 311, 370/318, 310.02; 713/320; 348/14.01–14.02, 348/333.13; 358/1.13, 1.14, 1.16
See application file for complete search history.

(56) References Cited

U.S. PATENT DOCUMENTS

| 6,414,955 | B1 * | 7/2002 | Clare et al. ................. 370/390 |
| 2002/0132603 | A1 * | 9/2002 | Lindskog et al. ............ 455/343 |
| 2004/0097268 | A1 * | 5/2004 | Kurokawa et al. .......... 455/561 |
| 2004/0103278 | A1 * | 5/2004 | Abhishek et al. ............ 713/160 |
| 2004/0125399 | A1 * | 7/2004 | Kobayashi ................. 358/1.14 |
| 2005/0047356 | A1 * | 3/2005 | Fujii et al. .................. 370/311 |
| 2005/0063348 | A1 * | 3/2005 | Donovan .................... 370/338 |
| 2005/0128988 | A1 * | 6/2005 | Simpson et al. ............. 370/338 |
| 2005/0270993 | A1 * | 12/2005 | Rajamani et al. ............ 370/311 |
| 2006/0120313 | A1 * | 6/2006 | Moritomo et al. ........... 370/311 |
| 2006/0193315 | A1 * | 8/2006 | Sinivaara et al. ............ 370/389 |
| 2007/0207765 | A1 * | 9/2007 | Nakahara et al. ......... 455/343.1 |
| 2008/0045159 | A1 * | 2/2008 | Mashimo et al. ............. 455/68 |
| 2009/0092068 | A1 * | 4/2009 | Moritomo et al. ........... 370/311 |

FOREIGN PATENT DOCUMENTS

| JP | 2001-007818 A | 1/2001 |
| JP | 2003-249936 A | 9/2003 |
| JP | 2003-348095 | 12/2003 |

OTHER PUBLICATIONS

The above references were cited in a Jul. 7, 2009 Japanese Office Action that issued in Japanese Patent Application No. 2004-321160, which is enclosed without English Translation.

* cited by examiner

*Primary Examiner*—Kamran Afshar
(74) *Attorney, Agent, or Firm*—Cowan, Liebowitz & Latman, P.C.

(57) ABSTRACT

When it is determined that a power mode is a power save mode, and that a MAC address in a received beacon matches the MAC address of a wireless communication apparatus which newly joins a wireless network, the power mode of all the communication apparatuses which have joined the wireless network is switched from the power save mode to a normal power mode.

16 Claims, 14 Drawing Sheets

FIG. 9

| MAC ADDRESS | POWER MANAGEMENT FLAG | JOIN FLAG |
|---|---|---|
| 11:22:33:44:55:66 | 1 | 1 |
| 01:02:03:04:05:06 | 0 | 1 |

COMMUNICATION APPARATUS, CONTROL METHOD, AND PROGRAM THEREFOR

FIELD OF THE INVENTION

The present invention relates to a communication apparatus, control method, and program therefore which can construct a network in, e.g., ad hoc mode based on with an IEEE802.11 standard.

BACKGROUND OF THE INVENTION

Recently, many wireless devices having wireless interfaces based on IEEE802.11 standard have been commercialized and become available. Most of wireless communication apparatuses having the wireless interfaces based on IEEE802.11 standard provide high portability, and are often used in portable devices. Most of portable devices are driven by a battery, and it is, therefore, important to reduce battery consumption.

The IEEE802.11 standard defines a power management specification to intermittently execute transmission and reception using the fact that an actual communication time is discontinuous even when a wireless interface is effective. A power management function based on IEEE802.11 standard includes an active mode in which data can always be received, and a power save mode in which data can be received only under a specific condition. The IEEE802.11 standard defines an infrastructure mode in which a wireless communication apparatus (station) communicates with another wireless communication apparatus via an access point serving as a base station, and an ad hoc mode in which stations communicate with each other. Note that the power save mode is disclosed in Japanese Patent Laid-Open No. 2003-348095.

A large difference between the infrastructure mode and ad hoc mode in power management is as follows. In the infrastructure mode, an access point is always a communication partner of the station and is always in the active mode. Hence, the station can transmit data without consideration of the power management state of the communication partner (access point). To the contrary, in the ad hoc mode, a station serving as the communication partner may be in the power save mode. Therefore, data must always be transmitted while considering whether the partner is in the active mode or power save mode. Accordingly, processing becomes complex.

As has been described above, a power management function in the ad hoc mode is complex, and has not been installed in a product. However, it is anticipated that the power management function will be installed in various products hereinafter. If the product having the power management function in the ad hoc mode appears on the market, many wireless communication apparatuses will communicate with each other in the power save mode state in an ad hoc network. However, when a wireless communication apparatus (to be referred to as a new apparatus hereinafter) having no power management function in the ad hoc mode joins the ad hoc network in which wireless communication is executed in the power save mode state, the following problems are posed.

For example, since the new apparatus which newly joins the ad hoc network has no power management function, the new apparatus is always in the active mode, and performs communication by regarding the partner as the wireless communication apparatus in the active mode. Hence, the partner wireless communication apparatus in the power save mode cannot receive data from the new apparatus.

The present invention has been made in consideration of the above situation, and has as its object to provide a communication apparatus, control method, and program therefore which can prevent data download error when the communication apparatus newly joins a network in a power save mode.

SUMMARY OF THE INVENTION

The present invention has been made to solve the above problem. According to the present invention, a communication apparatus is comprising a communication device adapted to directly communicate with a first communication apparatus, switching device adapted to switch a power mode of the communication device, and a detection device adapted to detect that a second communication apparatus newly joins a network to which the communication apparatus has joined, wherein the switching device switches the power mode of the communication device from a power save mode to another power mode in accordance with a detection result obtained by the detection device.

Therefore, according to the present invention, all the communication apparatuses in the network are switched from the power save mode to, e.g., the normal power mode while being compatible with the second communication apparatus, even when the second communication apparatus having no power management function newly joins the network in the power save mode state. Accordingly, the data is not dropped out during communication with the second communication apparatus.

According to the present invention, a control method for a communication apparatus having a communication unit which directly communicates with communication apparatuses, is comprising a detection step of detecting that another communication apparatus joins a network to which the communication apparatus has joined, and a switching step of switching a power mode of the communication unit from a power save mode to another power mode in accordance with a detection result obtained in the detection step.

According to the present invention, a program for a communication apparatus having a communication unit which directly communicates with communication apparatuses, is a program for making a computer execute a detection step of detecting that another communication apparatus joins a network to which the communication apparatus has joined, and a switching step of switching a power mode of the communication unit from a power save mode to another power mode in accordance with a detection result obtained in the detection step.

In the present invention, when the network in which the communication apparatuses directly communicate with each other is constructed in the power save mode, the data download error can be prevented even if the communication apparatus newly joins the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a view showing an ad hoc network configuration device list 91 in a digital camera 101 according to the second embodiment;

DETAILED DESCRIPTION OF THE PREFERRED EMBODIMENTS

Preferred embodiments of the present invention will be described in detail in accordance with the accompanying drawings.

First Embodiment

Figure 1:
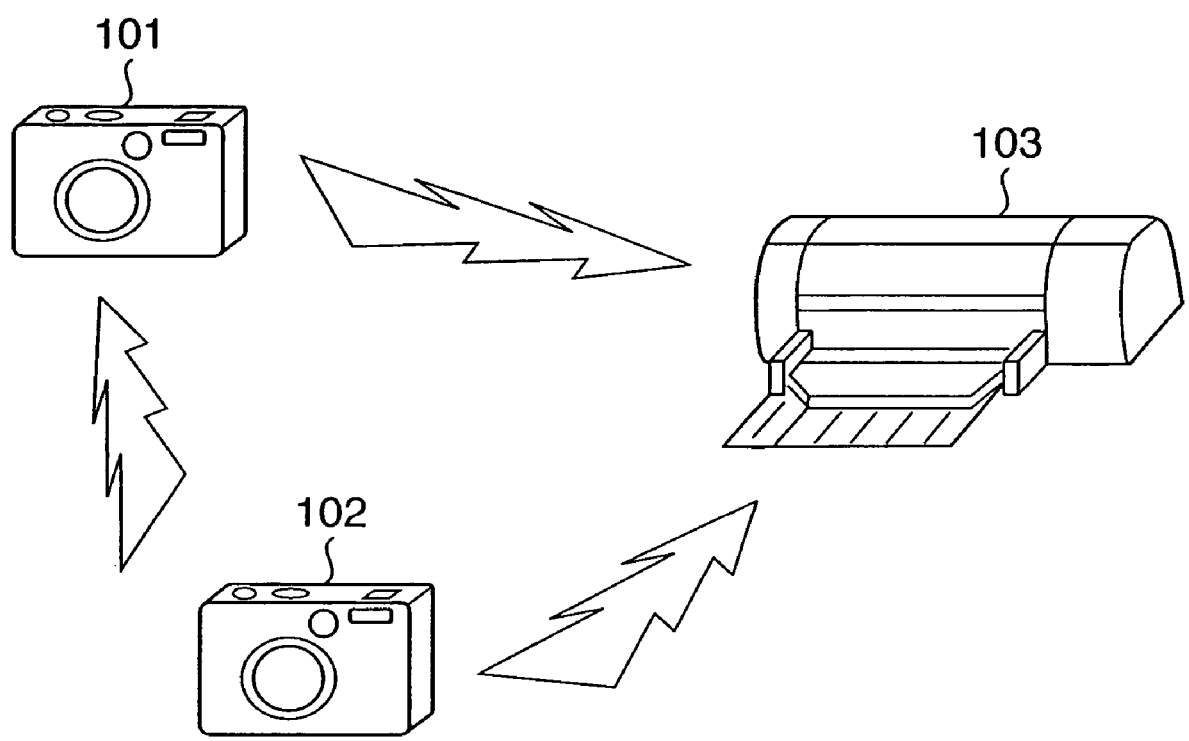
FIG. 1 is a schematic view showing an example of the arrangement of a wireless communication network including a digital camera (wireless communication apparatus) having a wireless communication function according to the first embodiment of the present invention.

FIG. 1 is a schematic view showing an example of the arrangement of a wireless communication network including a printer (wireless communication apparatus) and a digital camera (wireless communication apparatus) each having a wireless communication function based on IEEE802.11 standard according to the first embodiment of the present invention. As shown in FIG. 1, according to the first embodiment, assume that a digital camera 101 having a power management function joins an ad hoc network.(e.g., whose SSID (Service Set IDentifier) is SaveNet) generated by a printer 103 having the power management function in wireless communication, and communication is performed in a power save mode. Additionally, a case wherein a digital camera 102 having no power management function joins the ad hoc network will be described below. Note that the power save mode in this description complies with the IEEE802.11 standard. In this mode, power consumption can be reduced by intermittently executing transmission and reception for each beacon interval.

Note that the ad hoc network is a wireless network in which all the wireless communication apparatuses in the wireless network can simultaneously transmit and receive data for a predetermined period of time, and the wireless communication apparatuses can directly communicate with each other without the mediacy of a base station (access point). More specifically, the wireless communication apparatuses transmit/receive data to/from each other for a predetermined period of time using a periodic beacon signal (packet signal) as trigger. This beacon signal can include various pieces of information.

Figure 2:
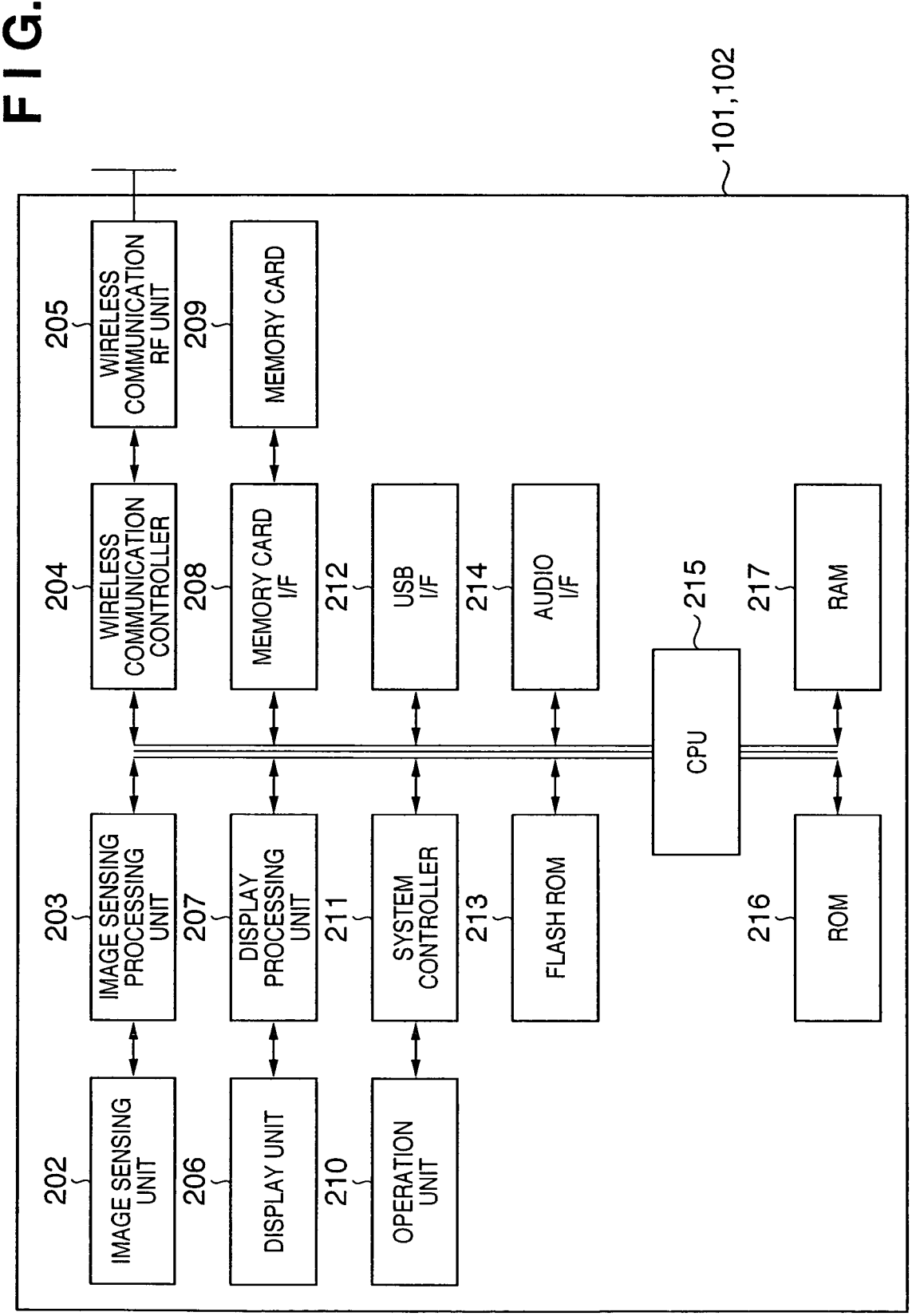
FIG. 2 is a functional block diagram of digital cameras 101 and 102 according to the first embodiment.

FIG. 2 is a functional block diagram of the digital cameras 101 and 102 according to the first embodiment. In FIG. 2, the digital cameras 101 and 102 have identical functional blocks, but different power management functions of wireless communication controllers (wireless communication control means) 204. The wireless communication controller of the digital camera 101 has the power management function (power save mode function), but the wireless communication controller of the digital camera 102 does not have that function. An operation unit 210 of the digital camera is connected to a CPU (Central Processing Unit) 215 via a system controller 211, and includes the shutter switch and various keys of the digital camera.

An image sensing unit 202 is a block which senses an image when the shutter of the operation unit 210 is pressed, and a sensed signal output by the operation unit 210 is processed by an image sensing processing unit 203. A display unit 206 is a block which displays information to the user (e.g., LCD (Liquid Crystal Display) display, LED (Light Emitting Diode) display, and audio indication). The display contents of the display unit 206 are controlled by a display processing unit 207. An operation such as selection from information displayed on the display unit 206 is performed in synchronism with the operation unit 210. That is, the display unit 206 and operation unit 210 construct a user interface.

A memory card I/F (interface) 208 is used to connect a memory card 209, a USB (Universal Serial Bus) I/F 212 is used to connect an external device via a USB, and an audio I/F 214 is used to exchange an audio signal with an external device. These functional units shown in the block diagram are processed under the control of the CPU 215, and programs controlled by the CPU 215 are stored in a ROM (Read Only Memory) 216 or flash ROM 213 in order to perform the control of the CPU 215.

Data processed by the CPU 215 is written/read out in/from a RAM (Random Access Memory) 217 or the flash ROM 213. The flash ROM 213 is a nonvolatile storage area. Note that sensed image data is written (saved) in the memory card 209 via the memory card I/F 208 after a well-known compression process.

A wireless communication RF unit (communication circuit) 205 and the wireless communication controller 204 construct a wireless communication interface (communication means). The wireless communication RF unit 205 comprises a hardware block which converts an analog signal received from an antenna into a digital signal, or converts a digital signal into an analog signal and transmits the analog signal from the antenna. The wireless communication controller 204 is formed from hardware which processes MAC (Media Access Control) layers for controlling communication and firmware for driving the MAC layers. The wireless communication controller 204 incorporates the flash ROM which can store a MAC address and the like.

These functional units shown in the block diagram are processed under the control of the CPU 215, and programs (drivers) controlled by the CPU 215 are stored in the ROM 216 or flash ROM 213. The firmware may be stored in the flash ROM or the like present in the wireless communication controller 204, or may be stored in the flash ROM 213 or ROM 216 of the digital camera 101 or 102.

In the latter case, the firmware is loaded into the wireless communication controller 204 when the wireless interface is used. The flash ROM 213 stores parameters such as an SSID and encryption key necessary for wireless communication. When the wireless interface is used, these parameter values are handed from the driver to the wireless communication controller 204 to enable wireless communication.

Figure 3:
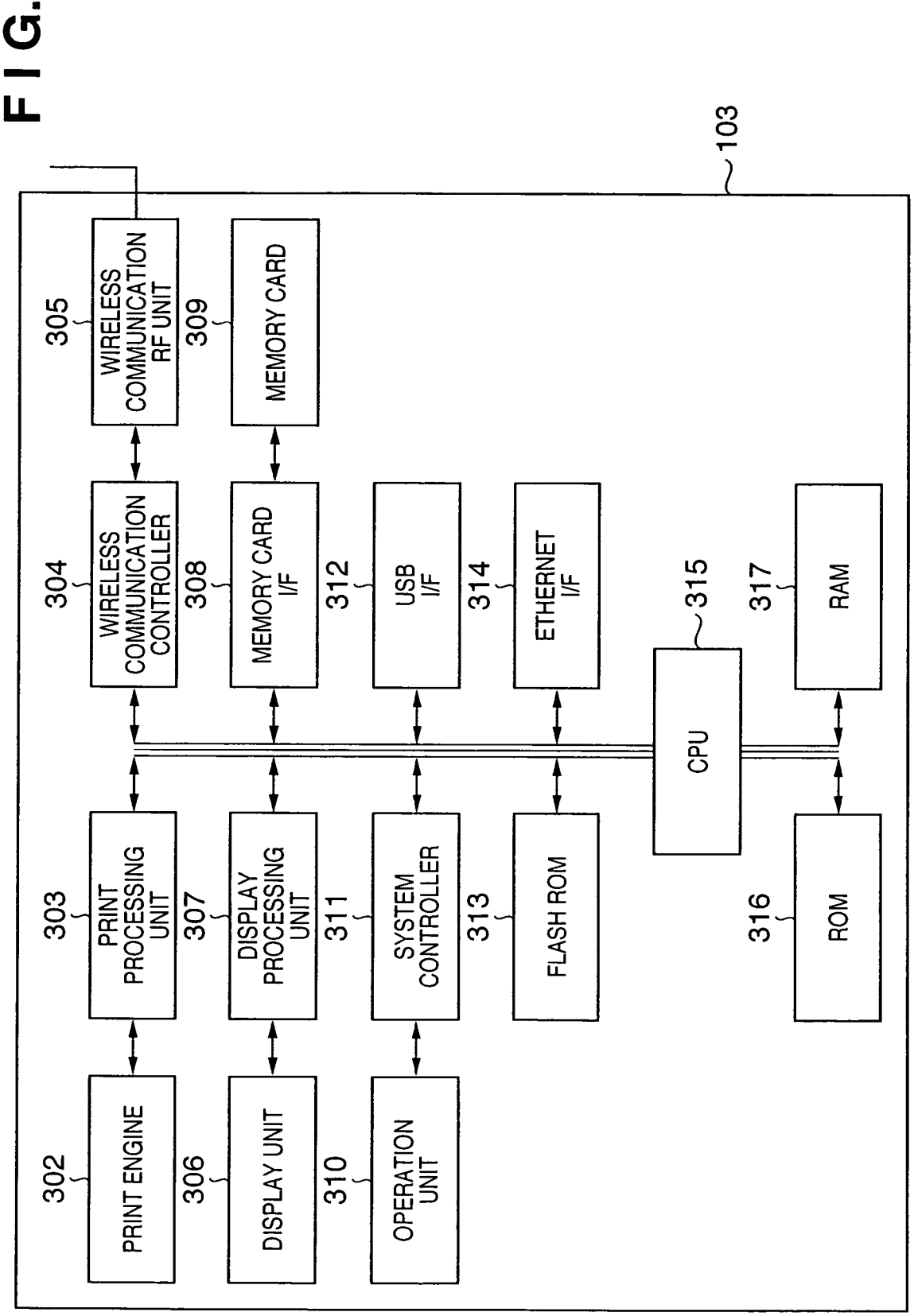
FIG. 3 is a functional block diagram of a printer 103 according to the first embodiment.

FIG. 3 is a functional block diagram of the printer 103 according to the first embodiment. An operation unit 310 of the printer 301 is connected to a CPU 315 via a system controller 311. A print engine 302 is a functional block which actually prints an image on paper, and the print engine 302 is controlled by a printing process unit 303. The print engine 302 is arbitrary as far as the above functions are included. For example, the printer 103 shown in FIG. 1 is an inkjet printer which is mainly used in home and discharges ink droplets by thermal energy onto a printing medium such as a printing sheet.

A display unit 306 is a block which displays information to the user (e.g., LCD display, LED display, and audio indication), and the display contents of the display unit 306 are controlled by a display processing unit 307. An operation such as selection from information displayed on the display unit 306 is performed via the operation unit 310. That is, the display unit 306 and operation unit 310 construct a user I/F of the printer 301 in the first embodiment.

A memory card I/F 308 is used to connect a detachable memory card 309. A memory card mounted in a digital camera is inserted into the memory card I/F 308, and then a sensed image can be printed.

A USB I/F 312 is used to connect an external device via a USB, and an ETHERNET I/F 314 is used to connect an external device by using ETHERNET communication. These functional units shown in the block diagram are processed under the control of the CPU 315, and programs controlled by the CPU 315 are stored in a ROM 316 or flash ROM 313. Data processed by the CPU 315 is written/read out in/from a RAM 317 or the flash ROM 313. The flash ROM 313 is a nonvolatile storage area.

A wireless communication RF unit 305 and wireless communication controller 304 construct a wireless interface. The wireless communication RF unit 305 comprises a hardware block which converts an analog signal received from an antenna into the digital signal, or converts a digital signal into an analog signal and transmits the analog signal from the antenna. The wireless communication controller 304 is formed from hardware which processes MAC layers for controlling communication and firmware for driving the MAC layers. The wireless communication controller 304 incorporates the flash ROM which can store a MAC address and the like.

These functional units shown in the block diagram are processed under the control of the CPU 315, and programs (drivers) controlled by the CPU 315 are stored in the ROM 316 or flash ROM 313. The firmware may be stored in the flash ROM or the like present in the wireless communication controller 304, or may be stored in the flash ROM 313 or ROM 316 of the printer 301.

In the latter case, the firmware is loaded into the wireless communication controller 304 when the wireless interface is used. The flash ROM 313 stores parameters such as the SSID and encryption key necessary for wireless communication. When the wireless interface is used, these parameter values are handed from the driver to the wireless communication controller 304 to enable wireless communication.

The configuration of the digital cameras 101 and 102 and that of the printer 103 according to the first embodiment have been described. The RF units are equipped with antennas, but the antennas may not always protrude outside. Especially for a digital camera 101 or 102, portability is an important factor, and the antenna is desirably incorporated in or mounted on the surface instead of protruding outside.

In the first embodiment, the printer 103 with the power management function constructs the ad hoc network, and the digital camera 101 joins the ad hoc network. Since the digital camera 101 also has the power management function, the printer 103 and digital camera 101 are communicating with each other after shifting to the power save mode. The processes of the apparatuses in a case wherein the digital camera 102 having no power management function joins the ad hoc network will be described below.

The drivers of the printer 103 and digital camera 101 have the same ad hoc network configuration device list. The ad hoc network configuration device list holds the MAC address of the wireless communication apparatus which joins the same ad hoc network.

Figure 4:
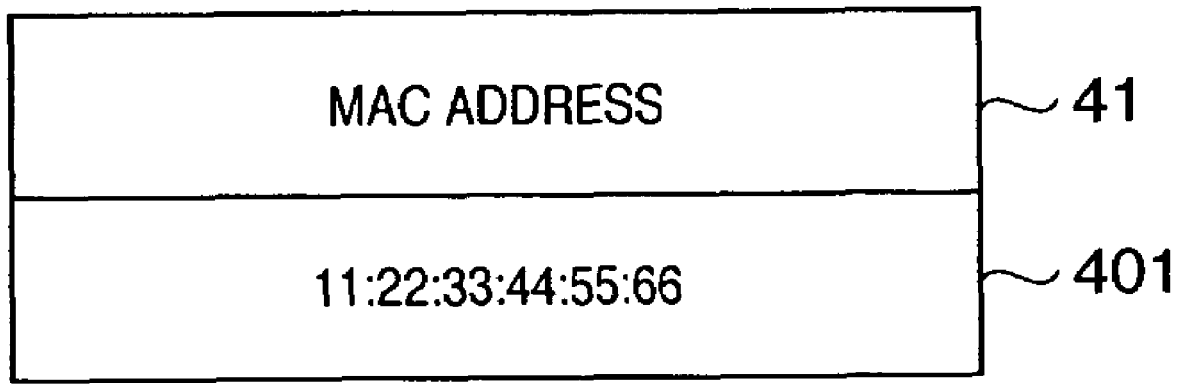
FIG. 4 is a view showing an example of an ad hoc network configuration device list in the digital camera 101.

FIG. 4 is a view showing an example of the ad hoc network configuration device list stored in the digital camera 101. As shown in FIG. 4, the ad hoc network configuration device list 41 stores the MAC address of the wireless communication apparatus which joins the ad hoc network.

The digital camera 101 which joins the ad hoc network generated by the printer 103 records the MAC address of the printer 103 in a list 401 of the ad hoc network configuration device list 41. In the first embodiment, the MAC address of the printer 103 is set at "11: 22: 33: 44: 55: 66". When the printer 103 detects that the digital camera 101 joins the ad hoc network, the printer 103 also records the MAC address of the digital camera 101 in the ad hoc network configuration device list of the printer 103.

Each of the wireless communication controller 304 of printer 103 and the wireless communication controller 204 of digital camera 101 has a function of notifying the driver of beacon reception upon receiving a beacon from another wireless communication apparatus which joins the same ad hoc network. Each of the wireless communication controllers 304 and 204 also has a function of starting a beacon reception notification process in accordance with a beacon reception notification start command issued by the driver. Each of the wireless communication controllers 304 and 204 also has a function of stopping the beacon reception notification process in accordance with a beacon reception notification stop command issued by the driver.

Figure 5:
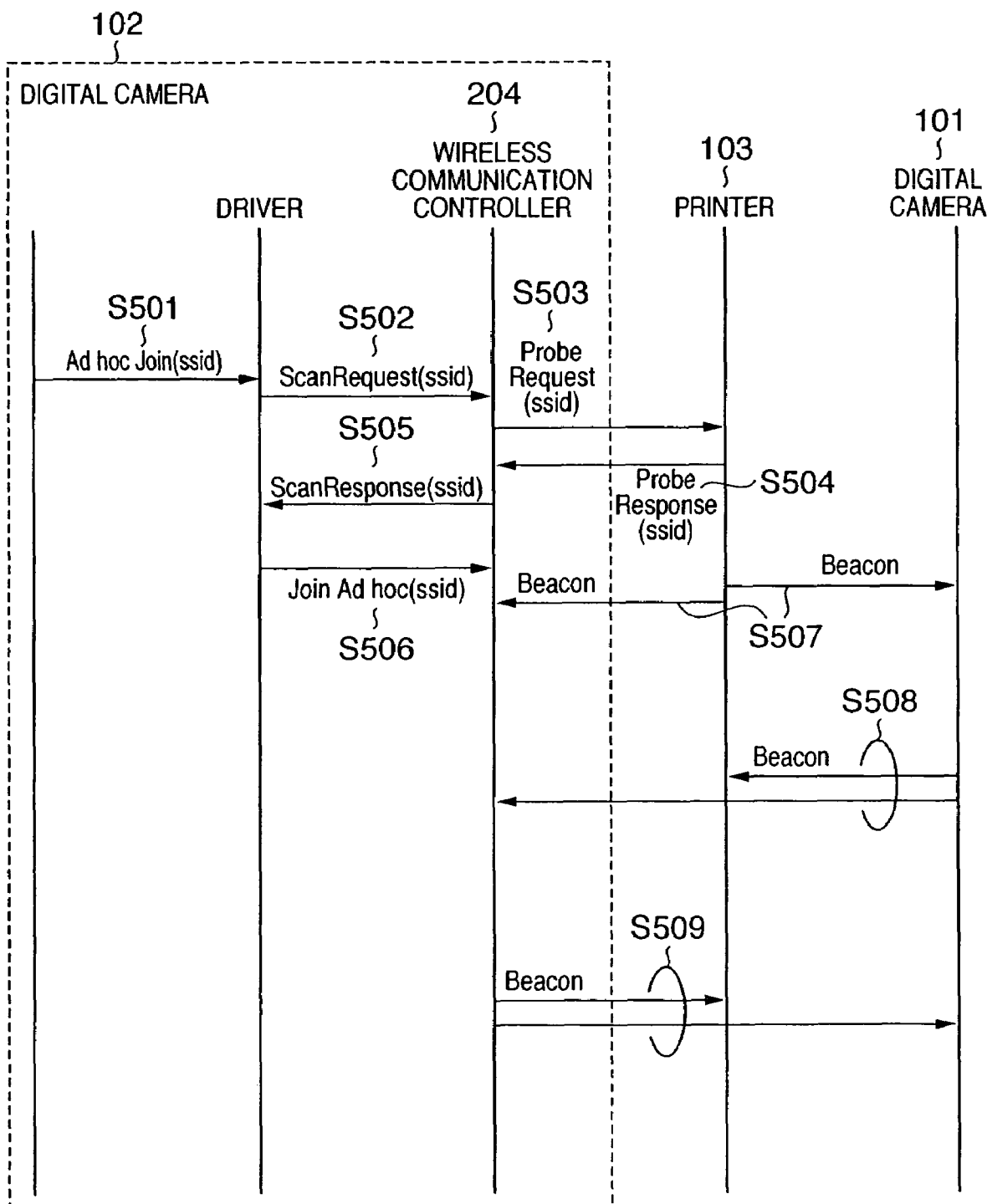
FIG. 5 is a sequence chart when the digital camera 102 joins the ad hoc network generated by the printer 103.

FIG. 5 is a sequence chart when the digital camera 102 joins the ad hoc network generated by the printer 103. First, the application program of the digital camera 102 issues a request to allow the digital camera 102 to join the ad hoc network whose SSID is "SaveNet" (step S501). Hence, the driver scans in order to confirm whether there is an ad hoc network whose SSID designates SaveNet. Scanning is achieved when the driver issues a series of commands to the wireless communication controller 204 (step S502). The commands are then processed by the wireless communication controller 204 and wireless communication RF unit 205, and Probe Request is transmitted to the air by a wireless communication radio wave. (step S503).

Since the printer 103 has already formed an ad hoc network by designating SaveNet as the SSID, the printer 103 receive Probe Request from the digital camera 102, and sends back Probe Response to the digital camera 102 as a response (step S504). The wireless communication controller 204 hands information obtained by received Probe Response to the driver (step S505).

As a result, the driver issues a series of setting commands to join the present ad hoc network to the wireless communication controller 204 (step S506). After the setting in S506 ends, and the digital camera 102 joins the ad hoc network, either of the printer 103, digital camera 101, and digital camera 102 in the same network transfers a beacon in a predetermined cycle (steps S507, S508, and S509).

Figure 6:
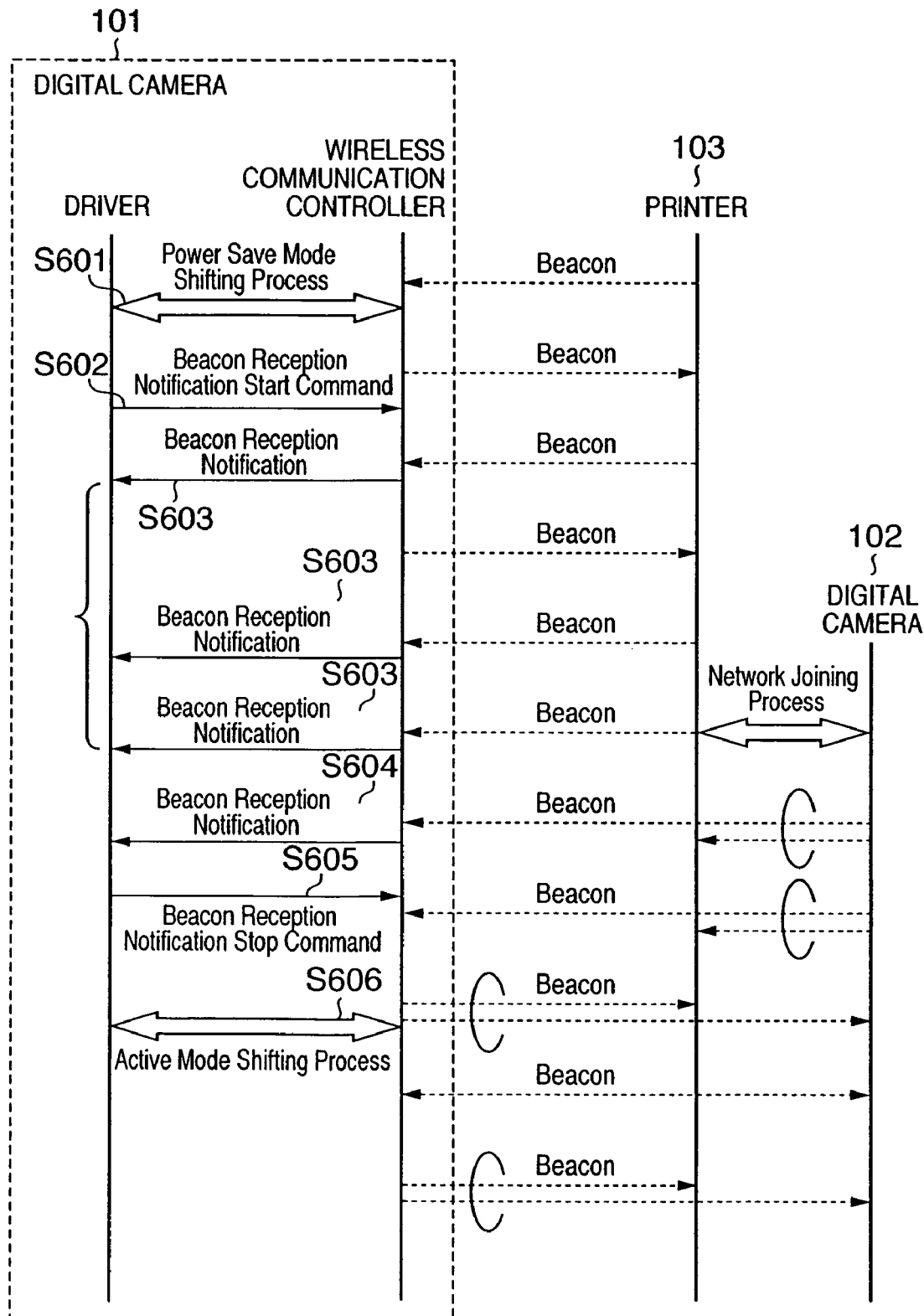
FIG. 6 is a sequence chart of an internal operation of the digital camera 101 when the digital camera 102 newly joins the ad hoc network after the digital camera 101 shifts to the power save mode.

FIG. 6 is a sequence chart showing the internal operation of the digital camera 101. More specifically, FIG. 6 is a sequence chart showing the internal operation from when the digital camera 101 joins the ad hoc network constructed by the printer 103 and shifts to the power save mode until the digital camera 102 newly joins the ad hoc network. With reference to FIG. 6., the digital camera 101 will be described below. However, the same process can be performed even when the printer 103 is used in place of the digital camera 101.

When the digital camera 101 completely shifts to the power save mode (step S601), the driver of the digital camera 101 issues the beacon reception notification start command to the wireless communication controller 204 (step S602). After that, upon reception of the beacon reception notification start command, the wireless communication controller 204 transmits a beacon reception signal to the driver whenever the beacon is received from the wireless communication apparatus in the same network (step S603).

A beacon reception notification parameter includes the MAC address of the wireless communication apparatus which transmits the beacon. In this case, upon reception of the beacon from the printer 103, the wireless communication controller 204 notifies the driver of the MAC address "11: 22: 33: 44: 55: 66" of the printer 103.

Upon reception of the beacon reception notification signal, the driver compares the MAC address saved in the ad hoc network configuration device list 41 with the MAC address notified by the beacon reception notification signal. In accordance with the comparison result, if the MAC addresses match, the comparison process ends, and then the MAC address saved in the ad hoc network configuration device list 41 will be compared with the MAC address notified by the next beacon reception notification signal. In the first embodiment, since the MAC address (11: 22: 33: 44: 55: 66) of the printer 103 has already been registered in the ad hoc network configuration device list 41 of the digital camera 101, the comparison process ends in this case.

Next, assume that the digital camera 102 joins the ad hoc network and generates a beacon. When the wireless communication controller 204 receives the beacon from the digital camera 102, the wireless communication controller 204 transmits the beacon reception notification signal to the driver (step S604). In the first embodiment, the MAC address of the digital camera 102 is set at "01: 02: 03: 04: 05: 06". Upon reception of the beacon reception notification signal, the driver compares the MAC address saved in the ad hoc network configuration device list 41 with the MAC address notified by the beacon reception notification signal. In accordance with the comparison result, since the MAC addresses do not match, the driver determines that a new wireless communication apparatus joins the ad hoc network, and adds the notified MAC address "01: 02: 03: 04: 05: 06" to the ad hoc network configuration device list 41.

The driver then issues the beacon reception notification stop command to the wireless communication controller 204 to stop the beacon reception notification (step S605). After that, the driver issues a series of commands to the wireless communication controller 204 to end the power save mode, stops the power save mode, and shifts to the active mode (step S606). After that, the driver will operate in the active mode.

The digital camera 102 has no power management function. Hence, it is always in the active mode, and performs communication by regarding the partner wireless communication apparatus as the apparatus in the active mode. The digital camera 101 and printer 103 in the power save mode detect that the digital camera 102 joins the network, and then shift to the active mode. Accordingly, the digital camera 102 can communicate with the digital camera 101 and printer 103.

That is, in the wireless communication apparatus (digital camera 101 or printer 103) according to the first embodiment, when the wireless communication apparatuses each having the power management function construct the ad hoc network, the power management function becomes effective to reduce power consumption. Additionally, when the new wireless communication apparatus without the power management function joins the ad hoc network, the power save mode autonomically ends to eliminate a packet loss and increase its reliability.

Figure 7:
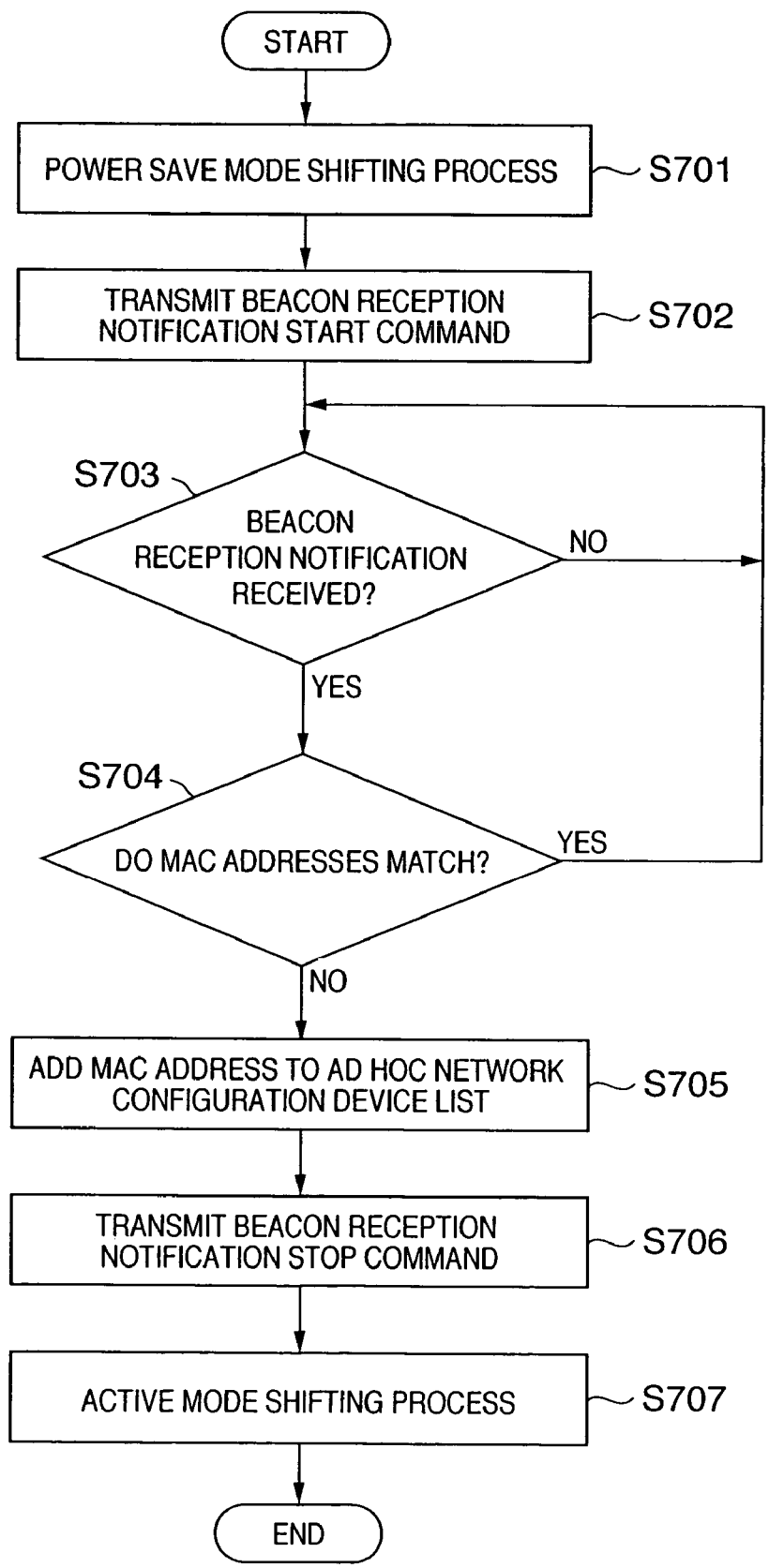
FIG. 7 is a flowchart showing an operation of a driver in the internal operation of the digital camera 101 shown in FIG. 6.

FIG. 7 is a flowchart showing the driver operation of the internal operation of the digital camera 101 shown in FIG. 6. With reference to FIG. 7, the digital camera 101 will be described below. However, the same process can be performed even when the driver of the printer 103 is used in place of the digital camera 101.

The digital camera 101 which joins the ad hoc network created by the printer 103 has the power management function, and its power saving management function is the power save mode (step S701). The driver then transmits the beacon reception notification start command to the wireless communication controller 204 (step S702). After that, the driver waits for a beacon reception notification (step S703).

Upon reception of a beacon reception notification signal, the driver compares the MAC address saved in the ad hoc network configuration device list 41 with the MAC address included in the notified beacon. In accordance with the comparison result, if the MAC addresses match (YES in step S704), the flow returns to step S703 again to wait for the next beacon reception notification.

Alternatively, when the MAC addresses do not match (NO in step S704), the driver adds the notified MAC address to the ad hoc network configuration device list 41 (step S705). Accordingly, the driver determines that the new wireless communication apparatus (digital camera 102 in FIG. 6) joins the ad hoc network. In this case, the driver issues a beacon reception notification stop command to the wireless communication controller 204 to stop the beacon reception notification (step S706). Next, the driver issues a series of commands to end the power save mode, and shifts to the active mode (step S707).

Figure 8:
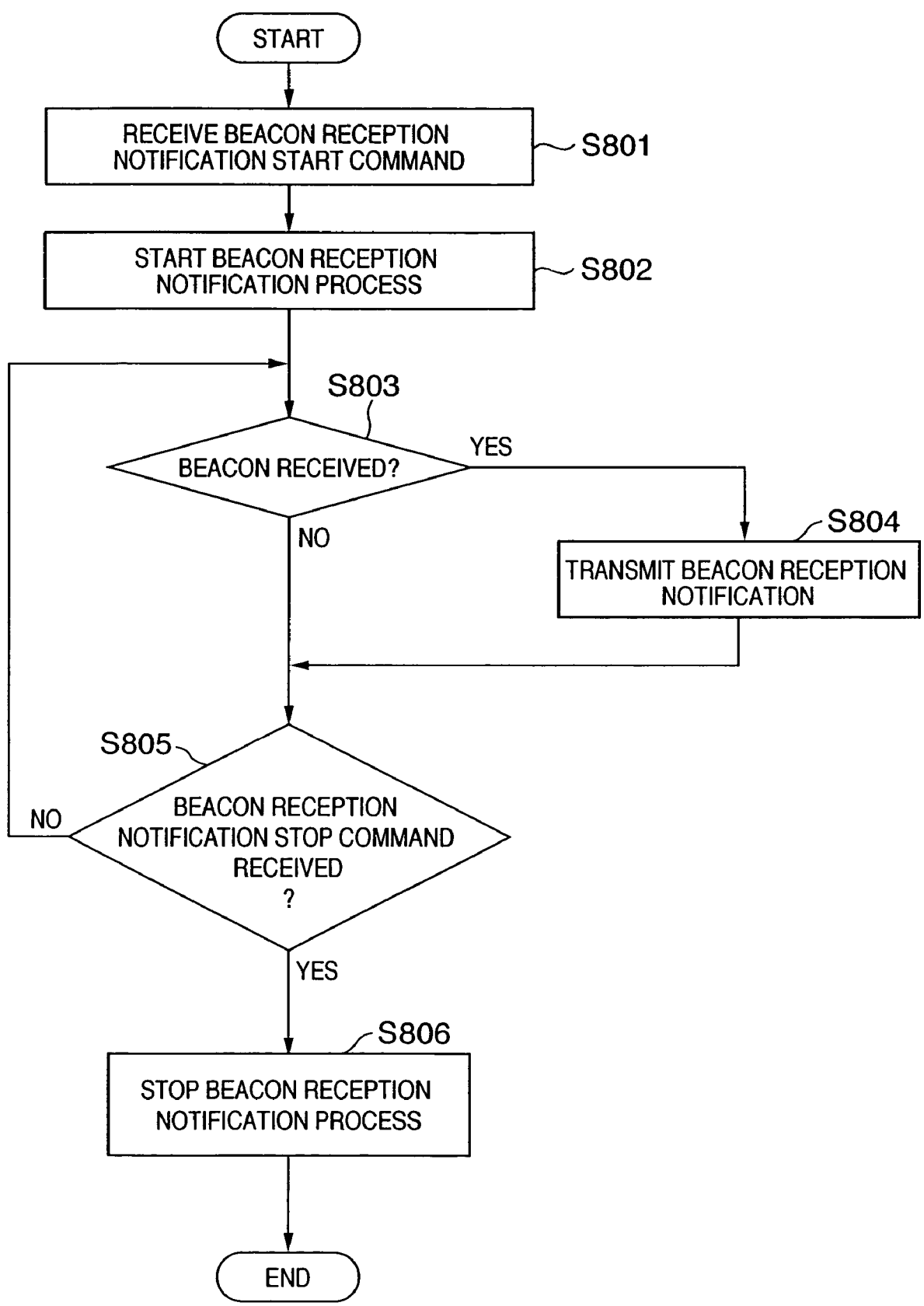
FIG. 8 is a flowchart showing an operation of a beacon reception notification process of a wireless communication controller 204 in the digital camera 101 shown in FIG. 6.

FIG. 8 is a flowchart showing the beacon reception notification process operation of the wireless communication controller 204 in the digital camera 101. With reference to FIG. 8, the digital camera 101 will be exemplified below. However, the same process can be performed even when the wireless communication controller 304 of the printer 103 is used in place of the digital camera 101.

As shown in FIG. 8, upon reception of the beacon reception notification start command from the driver (step S801), the wireless communication controller 204 shifts to the beacon reception notification processing mode (step S802). Whenever a beacon is received from another wireless communication apparatus which joins the same network, the wireless communication controller 204 fetches the MAC address of a beacon transmission source, generates the beacon reception notification signal, and transmits the generated signal to the driver (steps S803 and S804).

The wireless communication controller 204 then determines whether the beacon reception notification stop command is received from the driver (step S805). In accordance with the determination result, if it is determined that the beacon reception notification stop command is not received from the driver, the flow returns to the step S803. Alternatively, if it is determined that the beacon reception notification stop command is received from the driver, the wireless communication controller 204 stops the beacon reception notification processing mode (step S806).

Note that when the MAC address can be registered in the ad hoc network configuration device list 41 by the operation unit, and the MAC address registered by the user joins the network as a new wireless communication apparatus, the wireless communication apparatus is kept operated in the power save mode. When a wireless communication apparatus which is not registered in the ad hoc network configuration device list 41 newly joins the network, the wireless communication apparatus may shift to the active mode.

As described above, when the wireless communication apparatus (digital camera 102) without the power management function in the ad hoc mode joins the network in the power save mode, the wireless communication apparatus (digital camera 101 or printer 103) in the first embodiment autonomously shifts to the active mode to continue communication. Therefore, the packet loss is eliminated and its reliability can be increased.

Second Embodiment

A communication network including a digital camera 101 (wireless communication apparatus) will be described below in the second embodiment. Note that a network connection configuration and the hardware arrangements of the digital camera 101, a digital camera 102, and a printer 103 in the second embodiment are the same as those in the first embodiment, and a description thereof will be omitted.

The second embodiment is different from the first embodiment in that, even in the active mode, the beacon reception notification becomes effective for each predetermined period of time to confirm the wireless communication apparatus which joins an ad hoc network. In the second embodiment, the digital camera 101 will be exemplified.

FIG. 9 shows an ad hoc network configuration device list 91 in the digital camera 101 according to the second embodiment. As shown in FIG. 9, the ad hoc network configuration device list 91 included in the digital camera 101 and printer 103 each having a power management function in an ad hoc mode has a column 901 for recording the MAC address of the wireless communication apparatus which joins the ad hoc network. The ad hoc network configuration device list 91 also has a column 902 for recording a power management flag indicating whether the wireless communication apparatus has the power management function, and a column 903 for recording a join flag indicating whether the wireless communication apparatus joins the ad hoc network.

In the ad hoc network configuration device list 91, when the power management flag is "1", it is indicated that the wireless communication apparatus has the power management function. Alternatively, when the power management flag is "0", it is indicated that the wireless communication apparatus has no power management function. When the join flag is "1", it is indicated that the wireless communication apparatus joins the ad hoc network. Alternatively, the join flag is "0", it is indicated that the wireless communication apparatus does not join the ad hoc network.

The information of the printer 103 is indicated in a row 904. The MAC address of the printer 103 is "11: 22: 33: 44: 55: 66". The power management flag is "1" since the printer 103 has the power management function, and the join flag is "1" since the printer 103 joins the ad hoc network. The information of the digital camera 102 is indicated in a row 905. The MAC address of the digital camera 102 is "01: 02: 03: 04: 05: 06". The power management flag is "0" since the digital camera 102 has no power management function, and the join flag is "1" since the digital camera 102 joins the ad hoc network.

Figure 10:
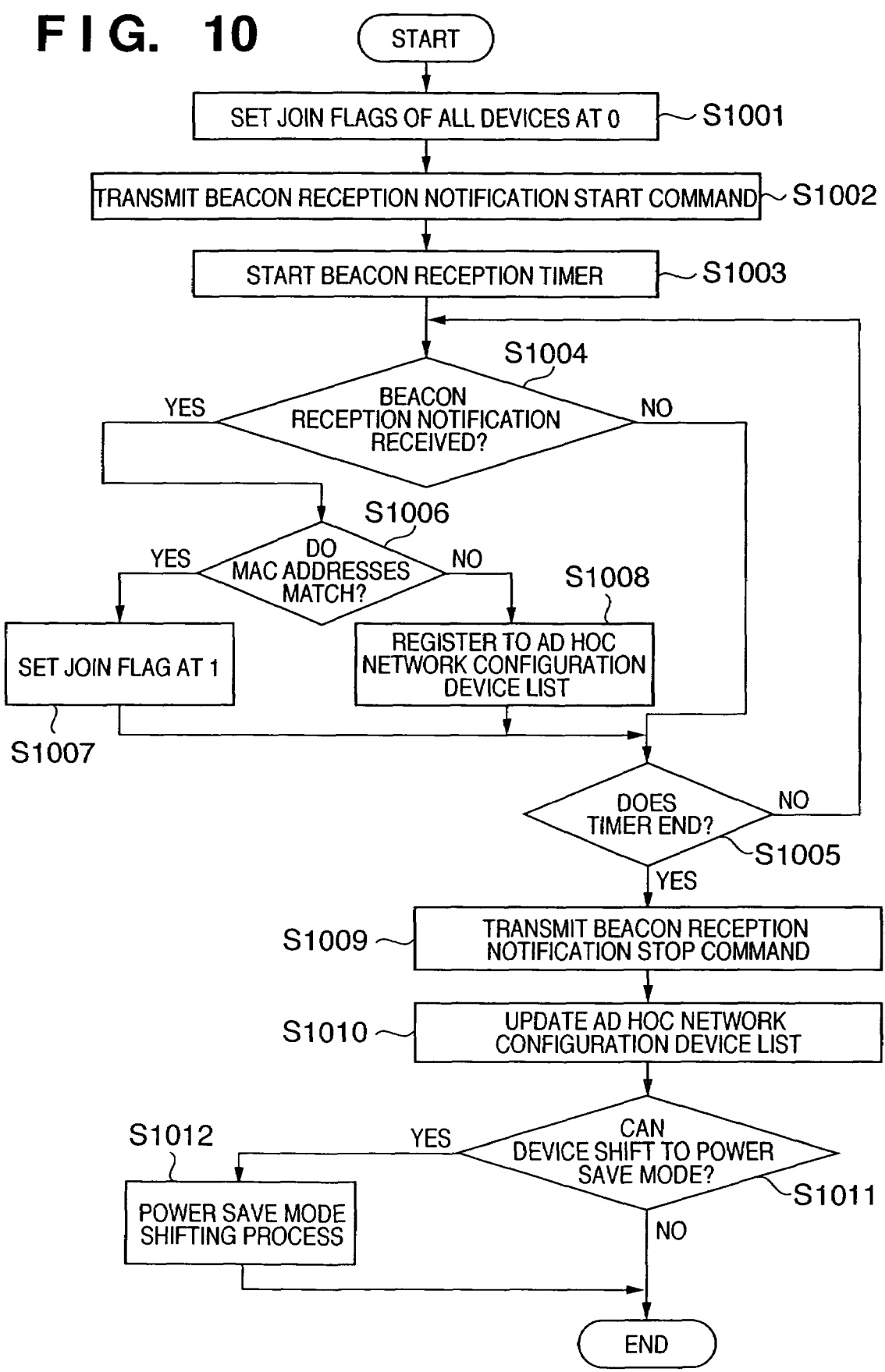
FIG. 10 is a flowchart showing an operation of a driver in the digital camera 101 after shifting to an active mode.

With reference to FIG. 10, the driver operation of the digital camera 101 after shifting to the active mode as the characteristic feature of this embodiment will be described. Note that the process until the digital camera 101 shifts to the active mode is the same as that of the first embodiment shown in FIG. 7. First, even after the digital camera 101 shifts to the active mode (normal communication mode), the driver of the digital camera 101 transmits a beacon reception notification start command to a wireless communication controller 204 in a predetermined cycle, and checks the wireless communication apparatus which joins the ad hoc network.

Before transmitting the bacon reception notification start command to the wireless communication controller 204, the driver of the digital camera 101 sets all the join flags of the wireless communication apparatuses registered in the ad hoc network configuration device list 91 at "0" (step S1001). The driver then transmits the beacon reception notification start command to the wireless communication controller 204 in a predetermined cycle (step S1002).

Next, the driver starts a timer which designates the period for waiting the beacon reception notification (step S1003). The driver then determines whether the beacon reception notification is received from the wireless communication controller 204 (step S1004). When it is determined that the beacon reception notification is not received (NO in step S1004), it is determined whether the timer which starts in step S1003 has ended (step S1005).

When it is determined in step S1004 that the beacon reception notification is received (YES in step S1004), the driver compares the MAC address included in the reception notification with the MAC address registered in the ad hoc network configuration device list 91 (step S1006). When it is determined that the MAC addresses match (YES in step S1006), the driver sets the join flag of the device of the corresponding MAC address in the ad hoc network configuration device list 91 at "1" (step S1007), and the flow advances to step S1005.

Alternatively, when it is determined that the MAC addresses do not match (NO in step S1006), the driver determines that the apparatus of the notified MAC address is the wireless communication apparatus (to be referred to as a new communication apparatus) which newly joins the network. The notified MAC address and the presence/absence of the power save mode are then registered to the ad hoc network configuration device list 91. The join flag then becomes "1", and the power management flag is set at a value corresponding to the new communication apparatus (step S1008). The flow then advances to step S1005.

When it is determined in step S1005 that the timer ends (YES in step S1005), the driver transmits a beacon reception notification stop command to the wireless communication controller 204 (step S1009). The driver then checks the ad hoc network configuration device list 91 deletes the wireless communication apparatus whose join flag is "0" from the list, and updates the ad hoc network configuration device list 91 (step S1010).

Next, the driver checks the power management flags of all the wireless communication apparatuses registered in the ad hoc network configuration device list 91 (step S1011). When it is determined that the power management flags of all the wireless communication apparatus are "1" (=all the wireless communication can shift to the power save mode) (YES in step S1011), the driver shifts to the power save mode (step S1012), and the process ends. Alternatively, if there is the power communication apparatus whose power management flag is "0" (NO in step S1011), the driver does not shift to the power save mode, and the process ends in the active mode.

As described above, according to the second embodiment, in a predetermined cycle even after shifting to the active mode, it is checked whether the wireless communication apparatuses which join the ad hoc network have the power management function. When all the wireless communication apparatuses which join the ad hoc network have the power management function, the apparatuses shift to the power save mode. Hence, power consumption can be further reduced while ensuring the communication reliability. When at least one of the wireless communication apparatuses without the power management function joins the network, the apparatuses do not shift to the power save mode, and is kept operated in the active mode. Hence, communication of the apparatus without the power management function can be ensured.

Third Embodiment

A communication network including a digital camera 101 (wireless communication apparatus) will be described below in the third embodiment. Note that a network connection configuration and the hardware arrangements of the digital camera 101, a digital camera 102, and a printer 103 in the third embodiment are the same as those in the first embodiment, and a description thereof will be omitted.

The third embodiment is different from the first embodiment in that, only upon reception of a beacon from a new wireless communication apparatus, a beacon reception notification signal is issued from a wireless communication controller 204 to a driver. In the third embodiment, the digital camera 101 will be exemplified.

In the third embodiment, the wireless communication controller 204 of the digital camera 101 has two beacon reception notification functions, i.e., a beacon reception notification function of notifying of beacon reception whenever the beacon is received, and a selection beacon reception notification function of notifying beacon reception only when a beacon which satisfies a specific condition is received.

The driver uses a beacon reception notification start command to make the beacon reception notification function effective, and a beacon reception notification stop command to stop the beacon reception notification function. The driver uses the selection beacon reception notification start command to make the selection beacon reception notification function effective, and the selection beacon reception notification stop command to stop the selection beacon reception notification function.

Figure 11:
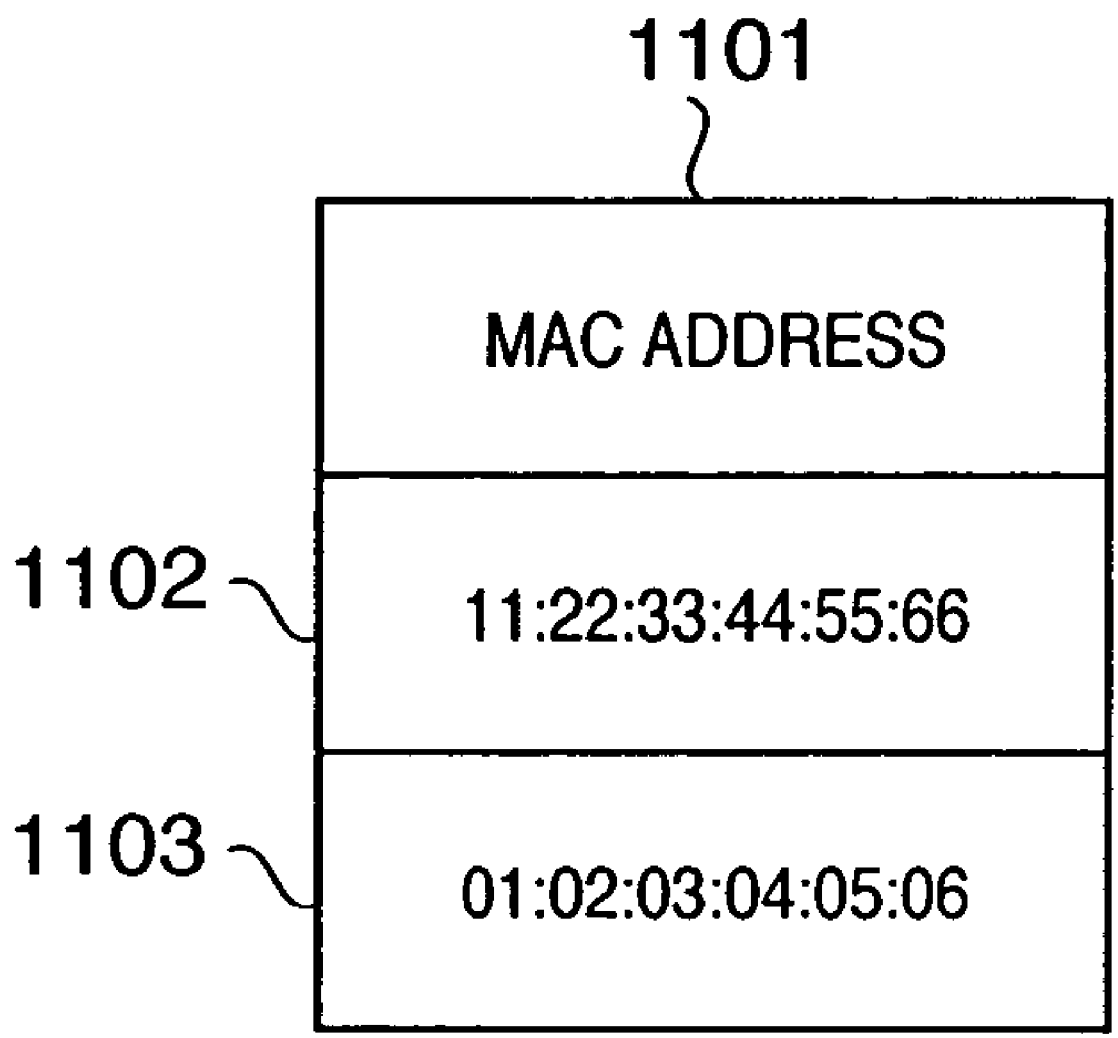
FIG. 11 is a view showing an example of a beacon transmission device MAC address list according to the third embodiment.

FIG. 11 is a view showing an example of a beacon transmission device MAC address list (identification information storage means) 1101 in the wireless communication controller 204 of the digital camera 101. According to the third embodiment, the wireless communication controller 204 includes the beacon transmission device MAC address list 1101 shown in FIG. 11. The beacon transmission device MAC address list 1101 stores the MAC address of the wireless device which has received the beacon. In FIG. 11, the beacon transmission device MAC address list 1101 stores a MAC address 1102 (11: 22: 33: 44: 55: 66) of the printer 103 and a MAC address 1103 (01: 02: 03: 04: 05: 06) of the digital camera 102.

Figure 12:
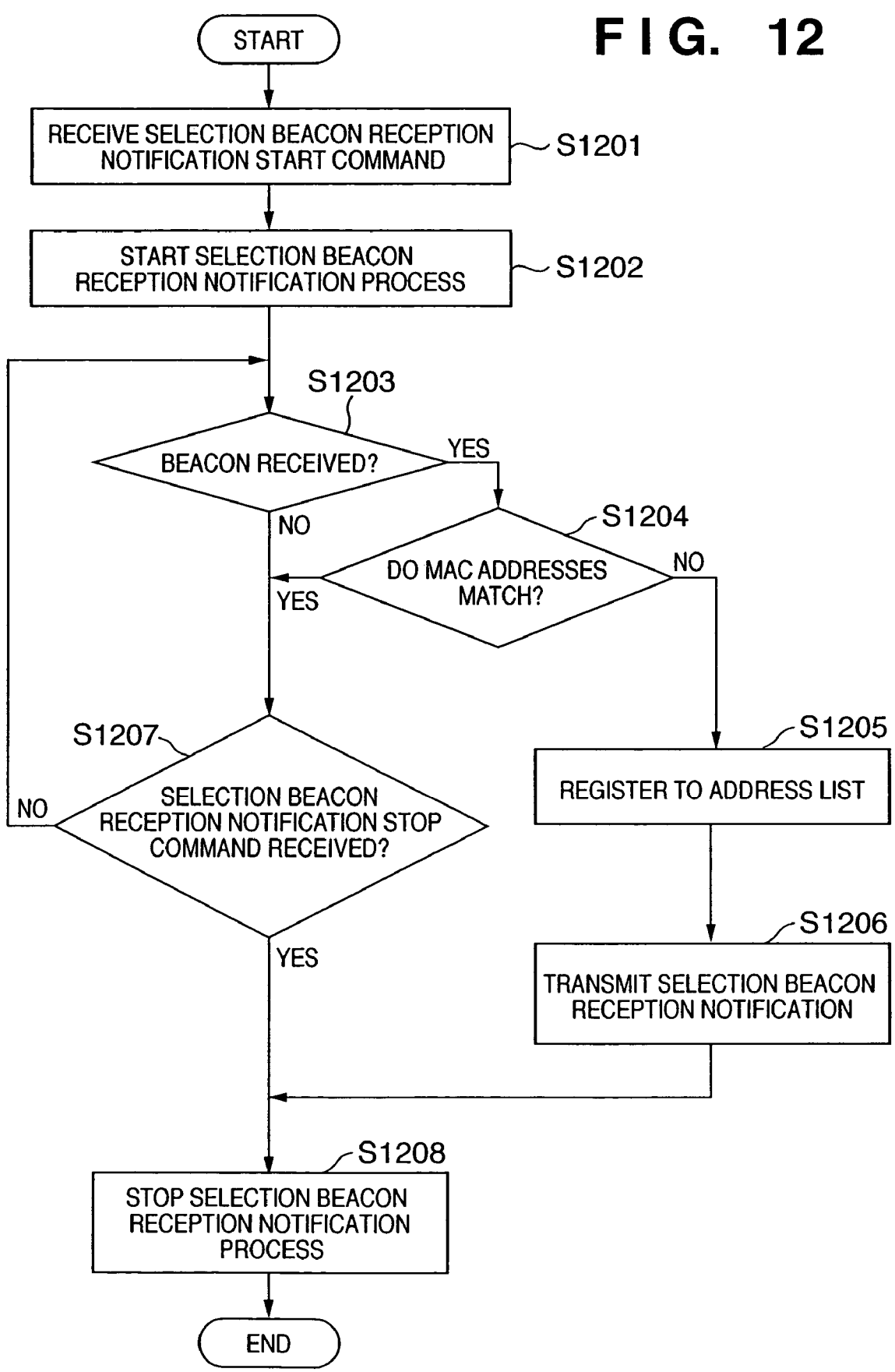
FIG. 12 is a flowchart showing the process of a wireless communication controller 204 according to the third embodiment.

FIG. 12 is a flowchart showing the selection beacon reception process of the wireless communication controller 204 according to the third embodiment. Upon reception of the selection beacon reception notification start command from the driver (step S1201), the wireless communication controller 204 starts a selection beacon reception process (step S1202).

The wireless communication controller 204 then determines whether the beacon transmitted by another wireless communication apparatus in the same network is received (step S1203). When it is determined that the beacon is received from another wireless communication apparatus in the same network (YES in step S1203), the wireless communication controller 204 compares the MAC address of a beacon transmission source with the MAC address in the beacon transmission device MAC address list 1101 (step S1204). Alternatively, when it is determined that the beacon is not received (NO in step S1203), the flow advances to step S1207 (to be described later).

When it is determined that the MAC address indicating the transmission source of the received beacon is not registered in the beacon transmission device MAC address list 1101 in accordance with the comparison result in step S1204 (NO in step S1204), the wireless communication controller 204 registers the received MAC address in the beacon transmission device MAC address list 1101 (step S1205). The wireless communication controller 204 then transmits a selection beacon reception notification signal to the driver (step S1206), and the flow advances to step S1207 (to be described later). Alternatively, when it is determined the MAC address indicating the transmission source of the received beacon is registered in the beacon transmission device MAC address list 1101 (YES in step S1204), the flow advances to step S1207 (to be described later).

A detailed example of steps S1204 to S1206 will be described below. When the digital camera 102 transmits the beacon as the new wireless communication apparatus in a state wherein the MAC address 1103 of the digital camera 102 has not saved in the beacon transmission device MAC address list 1101 in FIG. 11, the wireless communication controller 204 determines that the MAC address indicating the transmission source of the received beacon is not registered in the beacon transmission device MAC address list 1101. The wireless communication controller 204 registers the MAC address in the beacon transmission device MAC address list 1101, and transmits the selection beacon reception notification to the driver. Accordingly, the beacon transmission device MAC address list 1101 saves the MAC address 1103 of the digital camera 102 as shown in FIG. 11.

The wireless communication controller 204 then determines whether the selection beacon reception processing stop command is received from the driver (step S1207). When it is determined that the selection beacon reception processing stop command is received from the driver (YES in step S1207), the wireless communication controller 204 ends the selection beacon reception process (step S1208).

Figure 13:
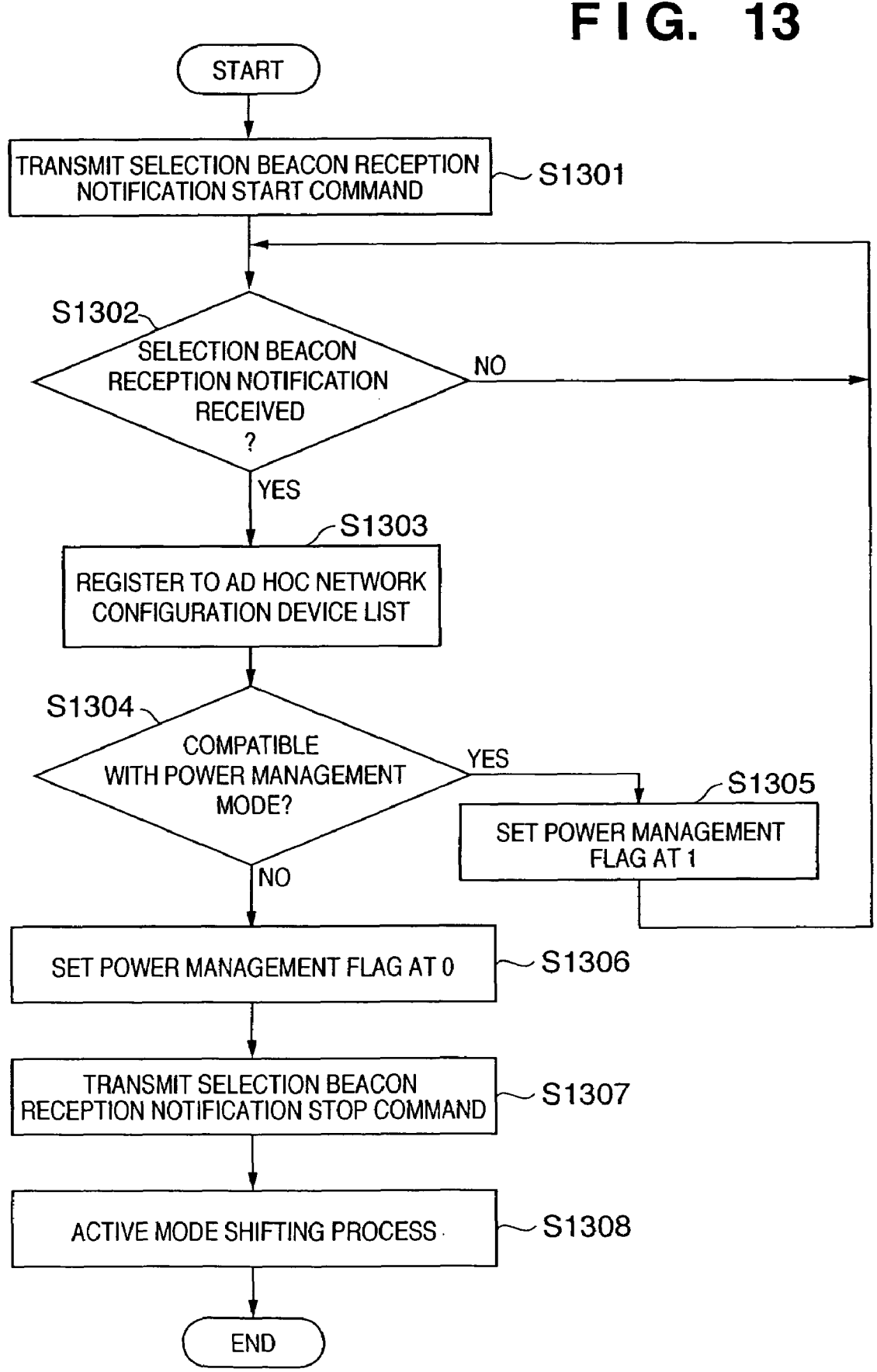
FIG. 13 is a flowchart showing the process of a driver according to the third embodiment.

FIG. 13 is a flowchart showing a driver process corresponding to the process of the wireless communication controller 204 shown in FIG. 12 according to the third embodiment. In FIG. 13, the driver shifts to the power save mode, and then transmits the selection beacon reception notification start command to the wireless communication controller 204 (step S1301). After that, the driver determines whether the selection beacon reception notification signal is received from the wireless communication controller 204 (step S1302). That is, the driver shifts to a standby state of the selection beacon reception notification.

When it is determined that the selection beacon reception notification signal is received (YES in step S1302), a driver updates an ad hoc network configuration device list 91 (step S1303). More specifically, the driver registers the notified MAC address in the ad hoc network configuration device list 91, and the join flag is set at "1". The driver then checks the power management function of the wireless communication apparatus which joins the network (step S1304). When it is determined that the new wireless communication apparatus is compatible with the power management function (YES in step S1304), the driver sets the power management flag of the notified MAC address at "1" in the ad hoc network configuration device list 91 (step S1305). After that, the flow returns to step S1302 to wait for the next selection beacon reception notification.

When it is determined in step S1304 that the new wireless communication apparatus is not compatible with the power management function, the driver sets the power management flag of the notified MAC address at "0" in the ad hoc network configuration device list 91 (step S1306). The driver then issues the selection beacon reception notification stop command to the wireless communication controller 204 to stop the beacon reception notification (step S1307). Next, the driver issues a series of commands to end the power save mode (step S1308). Accordingly, the wireless communication apparatus which constructs the ad hoc network ends the power save mode, and shifts to the active mode.

Figure 14:
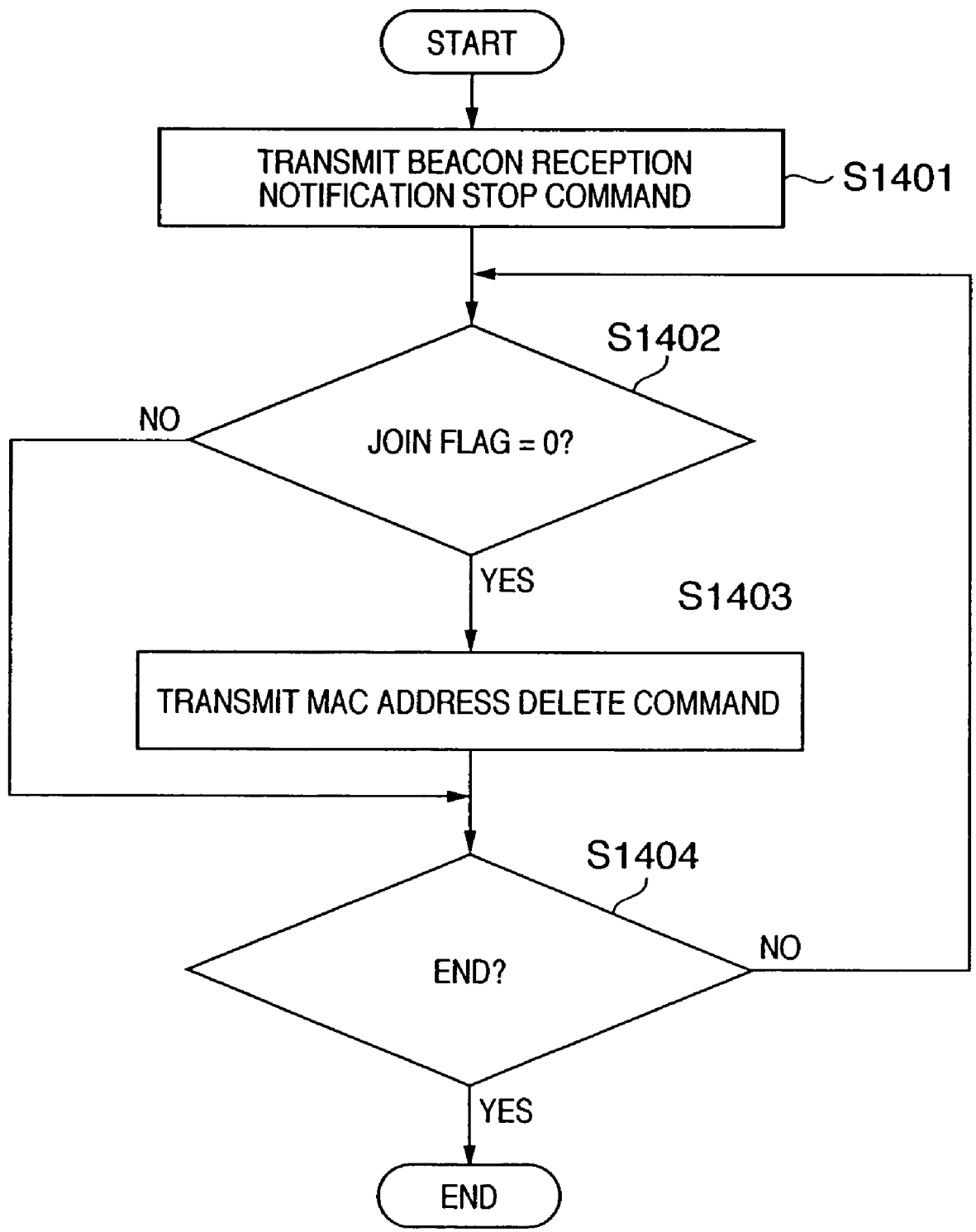
FIG. 14 is a flowchart showing the process of the driver after the driver shifts to the active mode, and a predetermined period of time has elapsed.

FIG. 14 is a flowchart showing a process of issuing the beacon reception notification start command to the wireless communication controller 204 for each predetermined cycle, and checking the wireless communication apparatus which joins the ad hoc network.

As shown in FIG. 14, first, the driver transmits the beacon reception notification stop command to the wireless communication controller 204 to stop the beacon reception notification process (step S1401). The driver then checks the join flag in the ad hoc network configuration device list 91 (step S1402). When the wireless communication apparatus whose join flag is "0" is found, the driver transmits to the wireless communication controller 204 a command to delete the corresponding MAC address from the beacon transmission device MAC address list 1101 (step S1403). Accordingly, the wireless communication controller 204 deletes the corresponding MAC address from the beacon transmission device MAC address list 1101.

The driver determines whether the processes in steps S1402 and S1403 are performed for all the wireless communication apparatuses in the ad hoc network configuration device list 91 (step S1404). When it is determined that the processes for all the wireless communication apparatuses have ended (YES in step S1404), the driver ends the processes. Although not shown, after that, when it is determined that all the wireless communication apparatuses registered in the ad hoc network configuration device list 91 have the power management function, the driver performs a process for shifting to the power save mode.

In accordance with the above-described driver process in step S1403, the wireless communication controller 204 which receives a MAC address delete command checks the beacon transmission device MAC address list 1101. In accordance with the checking result, when the matching MAC address is found, this MAC address is deleted from the beacon transmission device MAC address list 1101.

The third embodiment is different from the first and second embodiments in that the beacon reception is notified only when the wireless communication apparatus newly joins the ad hoc network.

The effectiveness of the third embodiment will be described below. Generally, a beacon cycle of transmitting the beacon is often 100 ms. In the mode wherein the wireless communication controller 204 notifies of the beacon reception in the first and second embodiments, the driver receives the beacon reception notification every 100 ms, and the driver load becomes heavy.

To the contrary, in the third embodiment, the beacon reception is notified from the wireless communication controller only when the wireless communication apparatus newly joins the ad hoc network. Hence, the driver load is decreased to increase the processing speed in the wireless communication apparatus.

When the wireless communication apparatus leaves the wireless network, the MAC address delete command is transmitted to the wireless communication controller 204 to update the beacon transmission device MAC address list 1101. Accordingly, the wireless communication apparatus which joins the network can be detected even when the same wireless communication apparatus joins the network again.

Note that according to the first to third embodiments, the processing complying with the IEEE802.11 standard is described. However, the present invention is not limited to this. The present invention can also be widely applied to the technique having the same function. In the first to third embodiments, the printer and digital camera are exemplified as the wireless communication apparatus. However, the wireless communication apparatuses are not limited to these. In the first to third embodiments, the beacon packet is used to synchronously perform communication in the ad hoc network. However, the present invention is not limited to this. A management packet based on IEEE802.11 standard may also be used.

As described above, in the first and second embodiments, when the wireless communication apparatuses each having the power management function construct the ad hoc network, the digital camera 101 and printer 103 can make the power management function effective to reduce power consumption. Additionally, when the new wireless communication apparatus without the power management function joins the ad hoc network, the digital camera 101 and printer 103 autonomously end the power save mode to eliminate a packet loss and increase its reliability.

According to the second embodiment, the digital camera 101 and printer 103 check the wireless communication apparatus which joins the ad hoc network in a predetermined cycle even in the active mode. When all the joining wireless communication apparatuses have the power management function, they shift to the power save mode. Accordingly, power consumption can be further reduced while ensuring the communication reliability.

In the digital camera 101 and printer 103 according to the third embodiment, the beacon (packet) reception is notified from the wireless communication controller 204 to the driver only when the new wireless communication apparatus joins the ad hoc network. Hence, the driver load can be decreased to increase the processing speed in the wireless communication apparatus.

In the above-described embodiments, the functions of the processes of the driver and wireless communication controller 204 shown in FIGS. 5 to 8, FIG. 10, and FIGS. 12 to 14 can be implemented when the program for implementing the functions is read out from a memory (e.g., ROM 216 or flash ROM 213), and executed by a CPU 215.

Note that the present invention is not limited to the above-described arrangement. All or a part of functions of the driver and wireless communication controller 204 shown in FIGS. 5 to 8, FIG. 10, and FIGS. 12 to 14 may be implemented by dedicated hardware. The above-described memory is not limited to the ROM 216 or flash ROM 213. The memory may comprise a nonvolatile memory such as a magneto-optical disk and flash memory, a read only recording medium such as a CD-ROM, a volatile memory other than a RAM, or a computer-readable/writable recording medium implemented by these combinations.

The program for implementing the functions of the processes of the driver and wireless communication controller 204 shown in FIGS. 5 to 8, FIG. 10, and FIGS. 12 to 14 may be recorded on the computer-readable recording medium. The program recorded on this recording medium may be read by a computer system, and executed to implement the processes. Note that the "computer system" includes an OS and hardware such as a peripheral device. More specifically, the embodiments include a case wherein the functions of the embodiments are also realized when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

This "computer-readable recording medium" is a storage apparatus, e.g., a portable medium such as a flexible disk, magneto-optical disk, ROM, and CD-ROM, and hard disk incorporated in the computer system. The "computer-readable recording medium" also includes a medium holding a program for a predetermined period of time, e.g., a volatile memory (RAM) in the computer system serving as a server or client to which a program is transmitted through a network such as the Internet or a communication line such as a telephone line.

The above program may be transmitted from the computer system which stores the program in a storage unit or the like, to another computer system through a transmission medium or over a carrier in a transmission medium. The above "transmission medium" for transmitting the program is a medium having the function of transmitting information, e.g., a network (communication network) such as the Internet or a communication circuit (communication line) such as a telephone line.

The above program may be used to implement part of the above function. In addition, alternatively, the program may be a so-called differential file (differential program) that can implement the above-described function in combination of a program that has already been recorded in the computer system.

A program product such as a computer-readable recording medium on which the program is recorded can be applied as an embodiment of the present invention. The above-described program, recording medium, transmission medium, and program product are incorporated in the scope of the present invention.

As described above, the embodiments of the present invention have been described with reference the accompanying drawings. However, the detailed arrangement is not limited to these embodiments. The present invention can be made without departing from the spirit and scope thereof.

In the above description, the present invention is a wireless network including the wireless communication apparatus. The wireless network includes a plurality of wireless communication apparatuses each having a power management function (power management means). Even when a wireless communication apparatus (to be referred to as a new wireless communication apparatus hereinafter) without the power management function newly joins the wireless network in a power save mode state, all the wireless communication apparatuses in the wireless network perform wireless communication in a normal power mode while being compatible with the new wireless communication apparatus. Hence, communication can be performed without data download error.

Since the wireless communication apparatus in the wireless network switches to the normal power mode only when the new wireless communication apparatus has no power management function, the power mode can be controlled further effectively.

Additionally, since the wireless communication apparatus can switch to the power save mode when all the wireless communication apparatuses in the wireless network have the power management function, power consumption can be further reduced.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-321160 filed on Nov. 4, 2004, the entire contents of which are hereby incorporated by reference herein.

What is claimed is:

1. A communication apparatus comprising:
   a communication unit adapted to directly communicate with a first communication apparatus; and
   a controller unit adapted to:
     switch a power mode of said communication unit;
     detect that a second communication apparatus newly joins a network to which said communication apparatus has joined; and
     discriminate whether the second communication apparatus has a switching function of a power mode of a communication unit included in the second communication apparatus,
   wherein the power mode of said communication unit is switched from a power save mode to another power mode in accordance with a discrimination result obtained by said controller unit.

2. The apparatus according to claim 1, wherein the power mode of said communication unit is switched from the power save mode to said another power mode when the second communication apparatus does not have the switching function.

3. The apparatus according to claim 1, further comprising a storage unit adapted to store identification information of another communication apparatus,
   wherein the power mode of said communication unit is switched in accordance with a identification information of the second communication apparatus detected by said controller unit, and the identification information stored in said storage unit.

4. The apparatus according to claim 3, wherein said controller unit is further adapted to identify said another communication apparatus which joins the network, and
update the identification information stored in said storage unit, in accordance with an identification result.

5. The apparatus according to claim 1, wherein said controller unit is further adapted to decide whether all communication apparatuses which join the network which the communication apparatus has joined have the switching function of the power mode,
wherein the power mode of said communication unit is switched from said another power mode to the power save mode in accordance with a deciding result obtained by said controller unit.

6. The apparatus according to claim 1, wherein said controller unit detects that the second communication apparatus joins the network, on the basis of a received beacon signal.

7. The apparatus according to claim 1, wherein said controller unit detects that the second communication apparatus joins the network, on the basis of a management packet based on IEEE802.11 standard.

8. A control method for a communication apparatus having a communication unit which directly communicates with communication apparatuses, the method comprising:
detecting that another communication apparatus joins a network to which the communication apparatus has joined;
discriminating whether said another communication apparatus has a switching function of a power mode of a communication unit included in said another communication apparatus, and
switching a power mode of the communication unit from a power save mode to another power mode in accordance with a discrimination result obtained in said discriminating step.

9. A computer-readable medium storing thereon a program for a communication apparatus having a communication unit which directly communicates with communication apparatuses, the program comprising instructions to execute:
a detection step of detecting that another communication apparatus joins a network to which the communication apparatus has joined;
a discriminating step of discriminating whether said another communication apparatus has a switching function of a power mode of a communication unit included in said another communication apparatus; and
a switching step of switching a power mode of the communication unit from a power save mode to another power mode in accordance with a a discrimination result obtained in said discrimination step.

10. A communication apparatus comprising:
communication means for directly communicating with a first communication apparatus;
switching means for switching a power mode of said communication means;
detection means for detecting that a second communication apparatus newly joins a network to which said communication apparatus has joined; and
discrimination means for discriminating whether the second communication apparatus has a switching function of a power mode of a communication means included in the second communication apparatus,
wherein said switching means switches the power mode of said communication means from a power save mode to another power mode in accordance with and a discrimination result obtained by said discrimination means.

11. The apparatus according to claim 10, wherein said switching means switches the power mode when said discrimination means discriminates that the second communication apparatus does not have the switching function.

12. The apparatus according to claim 10, further comprising a storage means for storing identification information of another communication apparatus,
wherein said switching means switches the power mode in accordance with a identification information of the second communication apparatus detected by said detection means, and the identification information stored in said storage means.

13. The apparatus according to claim 12, further comprising an identification means for identifying said another communication apparatus which joins the network, and
update means for updating the identification information stored in said storage means, in accordance with an identification result obtained by said identification means.

14. The apparatus according to claim 10, further comprising a deciding means for deciding whether all communication apparatuses which join the network which the communication apparatus has joined have the switching function,
wherein said switching means switches the power mode of said communication means from said another power mode to the power save mode in accordance with a deciding result obtained by said deciding means.

15. The apparatus according to claim 10, wherein said detection means detects that the second communication apparatus joins the network, on the basis of a received beacon signal.

16. The apparatus according to claim 10, wherein said detection means detects that the second communication apparatus joins the network, on the basis of a management packet based on IEEE802.11 standard.

* * * * *